July 3, 1923.

E. SCHULTZ 1,460,446

RESILIENT WHEEL

Filed Dec. 21, 1920

Inventor
Ernest Schultz

By Lawrence Langner
Atty

July 3, 1923.
E. SCHULTZ
1,460,446
RESILIENT WHEEL
Filed Dec. 21, 1920    2 Sheets-Sheet 2
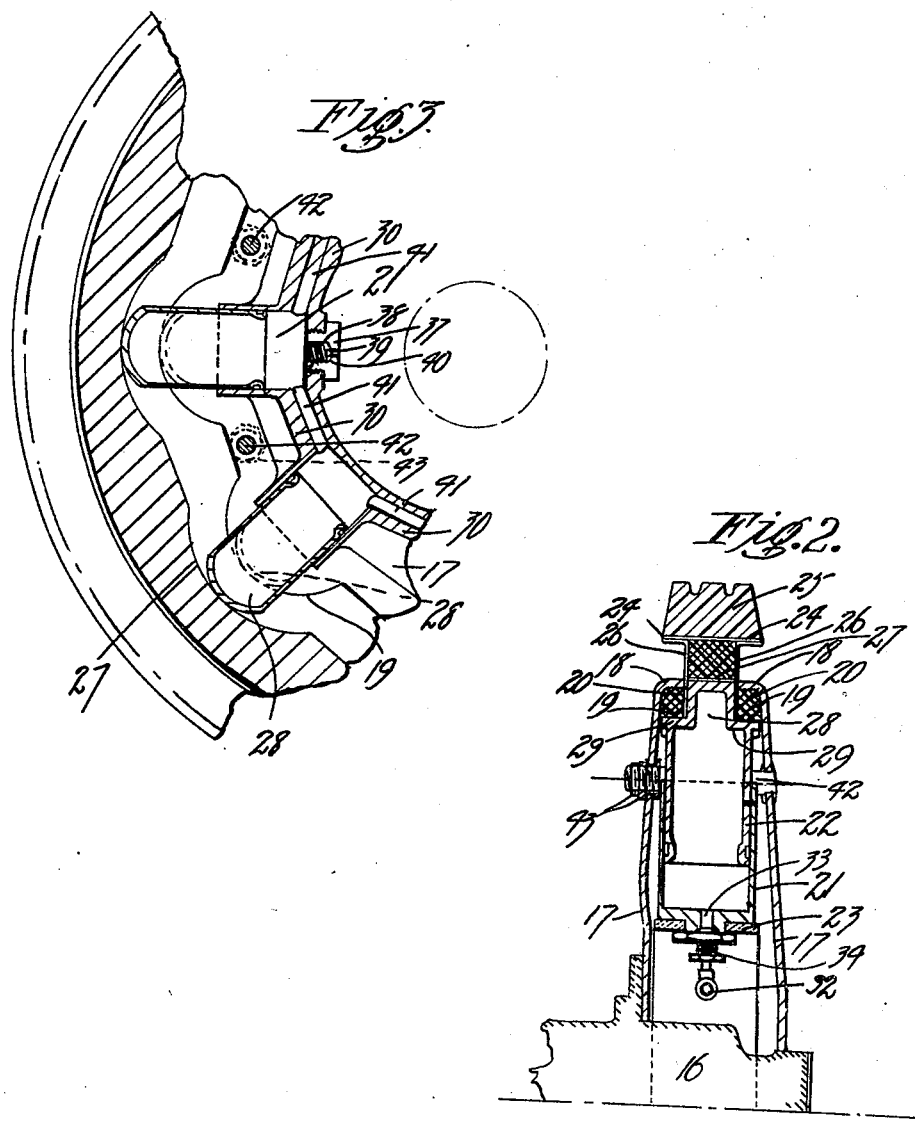
Inventor
Ernest Schultz
By Lawrence Langner
Attorney

Patented July 3, 1923.

1,460,446

UNITED STATES PATENT OFFICE.

ERNEST SCHULTZ, OF EAST MELBOURNE, VICTORIA, AUSTRALIA.

RESILIENT WHEEL.

Application filed December 21, 1920. Serial No. 432,284.

*To all whom it may concern:*

Be it known that ERNEST SCHULTZ, a citizen of the Commonwealth of Australia, and resident of 124 Grey Street, East Melbourne, in the State of Victoria, Commonwealth of Australia, has invented a certain new and useful Improvement in and Relating to Resilient Wheels, of which the following is a specification.

This invention relates to an improved resilient wheel and has been devised in order to provide a mechanically resilient wheel which is of greater utility than those at present in use.

The resilient wheels at present in use are defective particularly for the reason that the damping of shocks when received is localized at that point, no means being provided for distributing the shock simultaneously around the periphery of the wheel and furthermore great difficulty has been experienced in linking up the parts to provide a practical torque or braking effect.

This invention has been devised in order to overcome existing defects and to provide in a mechanically resilient tyre, cheap, simple and effective means which will not only simultaneously distribute or damp the shock around the periphery of the wheel but which will provide for sufficient torque or braking effect.

The invention consists in the provision of air pressure means adapted to exert outward pressure against concave surfaces on wheel rim members and also against corresponding concave surfaces on the tread ring of the wheel which is spaced concentrically from and outside the rim, the pressure means being so disposed that shock rebounds are taken simultaneously around the wheel, and the pressure being maintained outwardly from the wheel centre, the wheel is maintained in practical concentricity.

In order that the practical application of the invention may be more readily understood it will now be described with reference to the accompanying drawings in which:—

Figure 2 is a view in transverse section of a portion of Figure 1.

Figure 3 is a view in vertical section of an alternative arrangement to Figure 1.

Figure 1:
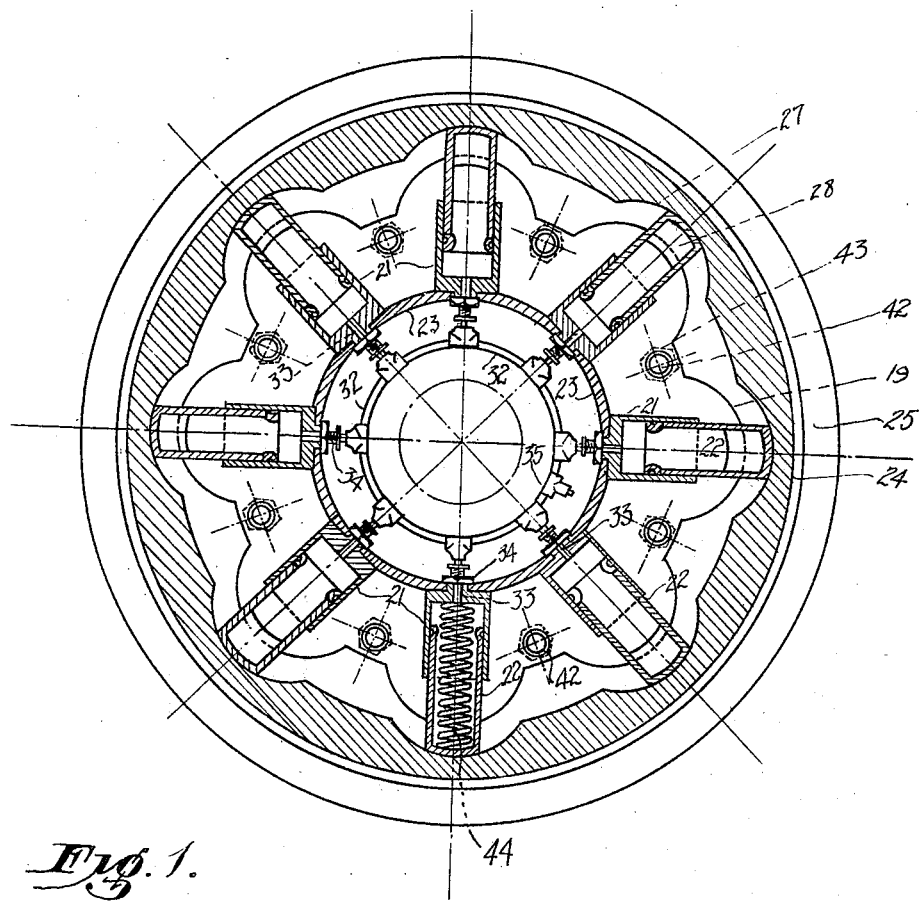
Figure 1 is a view in vertical central section of the improved resilient wheel.
Figure 4:
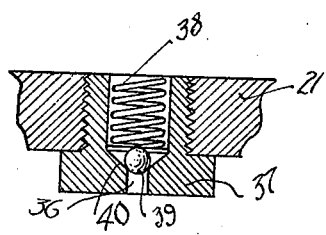
Figure 4 is a sectional view of an essential feature.

In the construction illustrated in Figures 1 and 2 of this invention the usual hub 16 is provided having discs 17 mounted thereon on either side, the outer edges being spaced from each other and being bent inwardly in the manner of ledges 18 to form rims which are provided with serrated or undulating surfaces 19. Preferably the contact surfaces 19 of the rims are formed of fibre or other suitable packing rings 20.

Cylinders 21 and pistons 22 are mounted so that they remain in a floating condition, the cylinders 21 connecting with a flexible ring or band 23 spaced from and surrounding the wheel butt and which provides a floating tie ring for the said cylinders.

Outside the rim 18 a tread ring 24 with a rubber or other tread 25 is mounted and the tread ring 24 is suitably spaced from the rims 18 to allow of resilient movement. The tread ring 24 is provided with spaced rings 26 projecting inwardly in working contact with the disc rims 18 while within the spaced rings 26 and formed on and adjacent the tread ring 24, and distanced outwardly from the serrations 19 on the rim rings 20, are further serrations 27 corresponding to those on the rim rings 20, the latter being of course, nearer the wheel centre. In order that the serrations or undulating surfaces 27 of the tread ring 24 contact with the pistons 22 each piston 22 at the centre and at the outer end is extended as at 28 inside the rings 26 of the tread so that the pistons at the point 28 are always in contact with the tread ring serrations 27 and at the points 29 are always in contact with the serrations 19 on the rim rings 20.

A flexible cylinder tie band 23 of suitable shape, spaced from the hub 16, is provided, the disc rims 20 and tread ring 24 are suitably positioned and spaced, and the required number of piston and cylinder spokes are provided, the cylinders 21 being preferably mounted to the flexible hub ring 23 while the sleeve pistons 22 are pressed outwardly against the concave portions or serrations 19 and 27 of the rim rings and tread ring respectively by the air pressure within each cylinder and piston, each piston head being formed with the extension 28 to allow of contact with the tread ring surface 27, Each cylinder 21 and piston 22 therefore preferably consists of telescoping tubes closed at the outer ends, the piston or outer member 22 being adapted to slide within the cylinder 21.

In order to ensure the rapid transmission of air through the cylinders and thus around the wheel on any shock the cylinders have free air communication with each other, the means employed in Figure 2 consisting in the mounting of a tubular pipe 32 between the hub 16 and the flexible floating tie ring 23 and each of the cylinders communicate with the tube 32 through the by-passes 33 and joint connections 34, while a valve nipple 35 may be provided in the pipe 32 to pump a preliminary air pressure into the cylinders if so desired.

In the modification illustrated in Figure 3, the inner ends of the cylinders 21 are formed integral with an inner ring 30 and in this ring 30 are passages 41 which allow of air communication between the cylinders 21 around the wheel while an air inlet valve 39 in a valve chamber 37 and normally held closed on its seat 40 by a spring 38 is also provided.

The side rim plates 17 are effectively held in position by the bolts 42 which are provided with lock nuts 43. In order that the normal load may be carried without utilizing the air pressure helical springs 44 (Figure 1) of sufficient strength may be mounted in the cylinders 21 and positioned so that they bear outwardly on the pistons, so that when a shock is imparted the springs and cylinders operate to perform the function herein described.

In operation the pistons 22 being normally extended the cylinders 21 are filled with air, and the normal load is taken but when extra weight is imparted or shocks taken the cylinders 21 affected impart increased pressure owing to the retention valve 39 being held against its seat and the shocks are thus simultaneously taken on air cushions around the periphery of the wheel, the shock being distributed through the cylinders 21 until it is damped, the outward movement of some of the pistons drawing in more air which is also simultaneously transmitted to the other cylinders and thus the return of the wheel to practical concentricity is assured.

By the above construction, the pressure of the pistons 22 is always exerted outwardly against and around the tread ring 24 and shocks when imparted are transmitted to and against the air cushions in the cylinders 21 around the periphery of the wheel and clear of the wheel centre 16.

I desire it to be understood that various modifications or improvements may be embodied without departing from the spirit and scope of the invention, the particular characteristic being the utilization of a continuous air container bearing outwardly against the rim and tread to cause the simultaneous displacement of air around the wheel on centrifugal motion or on shocks being imparted thereto.

What I claim as my invention and desire to secure by Letters Patent is:—

1. A resilient wheel comprising, in combination a continuous air ring surrounding and spaced from a wheel hub, air cylinders disposed radially around and connected to said ring, air passages in said ring, intercommunicating the cylinders to allow of uninterrupted air flow through all the cylinders, an air inlet retention valve for admitting and retaining air in the cylinders, pistons operating in said cylinders and bearing against concave surfaces formed around the inner periphery of a ring fitted with a tread and also bearing against concave surfaces on rim rings formed on plates bolted together and spaced from each other and connected to the hub there being a space between the tread ring and the rim rings for the purposes specified.

2. A resilient wheel comprising, in combination a concave surface formed on the inner surface of a ring supporting a tread, sleeve pistons having central extensions for operating against the tread surface, the pistons on each side being also arranged to operate against inner concave surfaces of rim rings said rim rings being supported by rigid side plates connected to the wheel hub, radial air cylinders receiving the pistons and disposed around a ring spaced from the hub, said cylinders providing an evenly distributed air pressure to the pistons around the wheel, and means for admitting air into the cylinders whereby to attain the required pressure, for the purposes specified.

Signed at Melbourne, Victoria, Australia, this 18th day of November 1920.

ERNEST SCHULTZ.

In the presence of—
SIDNEY HENDLEY,
A. EDWARDS.